United States Patent
Gupte et al.

(10) Patent No.: US 7,606,991 B2
(45) Date of Patent: Oct. 20, 2009

(54) DYNAMIC CLOCK SWITCH MECHANISM FOR MEMORIES TO IMPROVE PERFORMANCE

(75) Inventors: Ajit Deepak Gupte, Karnataka (IN); Aakash Agrawal, Karnataka (IN); Abhay Golecha, Rajastan (IN)

(73) Assignee: Texas Instruments Incorporated, Dallas, TX (US)

( * ) Notice: Subject to any disclaimer, the term of this patent is extended or adjusted under 35 U.S.C. 154(b) by 289 days.

(21) Appl. No.: 11/695,282

(22) Filed: Apr. 2, 2007

(65) Prior Publication Data

US 2007/0239937 A1    Oct. 11, 2007

Related U.S. Application Data

(60) Provisional application No. 60/744,369, filed on Apr. 6, 2006.

(51) Int. Cl.
*G06F 12/00* (2006.01)
(52) U.S. Cl. ...................................... 711/167
(58) Field of Classification Search .................. 711/167
See application file for complete search history.

(56) References Cited

U.S. PATENT DOCUMENTS 5,651,130 A * 7/1997 Hinkle et al. ................ 711/105
5,829,021 A * 10/1998 Yamamoto et al. .......... 711/118
6,803,783 B2 * 10/2004 Zhu et al. ..................... 326/30
7,243,244 B2 * 7/2007 Yoshitomi et al. ........... 713/300

OTHER PUBLICATIONS

Spohrer, T.; Marquette, D.; Gallup, M., "Test architecture of the Motorola 68040," Computer Design: VLSI in Computers and Processors, 1990. ICCD '90. Proceedings., 1990 IEEE International Conference on , vol., No., pp. 191-194, Sep. 17-19, 1990 URL: http://ieeexplore.ieee.org/stamp/stamp.jsp?arnumber=130199&isnumber=3623.*

* cited by examiner

*Primary Examiner*—Pierre-Michel Bataille
(74) *Attorney, Agent, or Firm*—Robert D. Marshall, Jr.; Wade J. Brady, III; Frederick J. Telecky, Jr.

(57) ABSTRACT

This invention improves cache operation by dynamically extending one state of a clock signal supplied to a cache on operation cycles when a cache fill operation will occur. The dynamic extension of the clock signal includes delaying the clock signal, forming a waveform toggling between states upon each predetermined state transition of the delayed clock signal, selecting the clock signal when this waveform has a first stage, and selecting the delayed clock signal when this waveform has a second state. Dynamic extension is prevented during a test mode. An apparatus of this invention uses a flip-flop and a multiplexer to produce the dynamically delayed clock.

2 Claims, 4 Drawing Sheets

DYNAMIC CLOCK SWITCH MECHANISM FOR MEMORIES TO IMPROVE PERFORMANCE

CLAIM OF PRIORITY

This application claims priority under 35 U.S.C. 119(e) (1) to U.S. Provisional Application No. 60/744,369 filed Apr. 6, 2006.

TECHNICAL FIELD OF THE INVENTION

The technical field of this invention is clock switching to improve cache memory access.

BACKGROUND OF THE INVENTION

A typical central processing unit (CPU) architecture consists of many pipeline stages. The CPU executes instructions in a pipelined fashion. Consecutive instructions in the program flow are processed in consecutive pipeline stages of the CPU simultaneously. This process is similar to a manufacturing assembly line. This process can greatly enhance the instructions executed per second throughput of the CPU. While the logic pipeline depth can be increased by splitting the logic across multiple pipeline stages, memory access in the data processing system often prove to be the bottleneck.

Many central processing architectures employ cache memory to speed memory access. A cache memory is a small, fast memory located close to the central processing unit core. The cache memory stores shadow copies of data from a much larger and more distant main memory. Access time to data stored in the cache is faster than access time to data stored in main memory. Cache memory is advantageous due to locality of memory access. Once data at a particular address location has been used, it is likely to be used again in the near future. Making a shadow copy of data in the cache has no advantage. However, additional accesses to that data in the near future can be serviced from that cache without waiting the longer time for access to main memory.

There is a tension between cache size and access speed. A larger cache may be advantageous because there is a larger probability that a particular data access will hit within the cache. However, a larger cache typically requires more area on the integrated circuit holding the central processing unit. This larger size also tends to make accesses slower. Thus any cache size selection is a compromise between contradictory goals. Thus as the amount of on-chip memory increases, the access times increase causing performance issues.

This invention is directed at the problem of performance bottlenecks created in memory to memory data paths. Memory to memory data paths often occur in cache systems where the cache memory misses are serviced by other on-chip main memory. To ensure minimum cache miss latency, a data fetch operation needed to service a cache miss in the cache memory from the main memory should use the smallest possible number of cycles. A single instruction cycle is best. Because the main memory access time is large, the data path from the main memory to the cache memory is typically longer than the target clock period. The prior art typically responded to this situation in one of two ways. It is feasible to reduce the clock frequency to permit single cycle access to main memory. This clock frequency reduction reduces the performance of the entire data processing system. Alternatively, the designer may insert an extra latency of 1 cycle in this memory to memory data path. This increases the cache fill latency. Thus there is a need in the art to provide reduced data access latency.

SUMMARY OF THE INVENTION

This invention addresses the problem above without requiring extra cache latency or reduction in the system clock frequency. In this invention, the clock to the cache is delayed in any cycle when a cache fill from the main memory occurs. This provides a longer time for the main memory to transfer data to the cache. As a result of delaying the clock to the cache, the data path from the cache to the central processing unit gets a shorter time. In most systems this shortened time is not acceptable. The cache to central processing unit path is also critical for system timing.

This invention ensures that when cache data are read by the central processing unit, the cache clock is not delayed. Thus the cache to central processing unit path advantageously gets a full clock period. This invention thus dynamically controls the clock.

BRIEF DESCRIPTION OF THE DRAWINGS

These and other aspects of this invention are illustrated in the drawings, in which.

DETAILED DESCRIPTION OF PREFERRED EMBODIMENTS

A preferred embodiment of this invention will be described in this section. This invention is not limited to the preferred embodiment. It would be a straight forward task for one skilled in the art to apply the invention to a larger class of data processing architectures. This description corresponds to the Texas Instruments TMS320C6400 digital signal processor.

Figure 1:
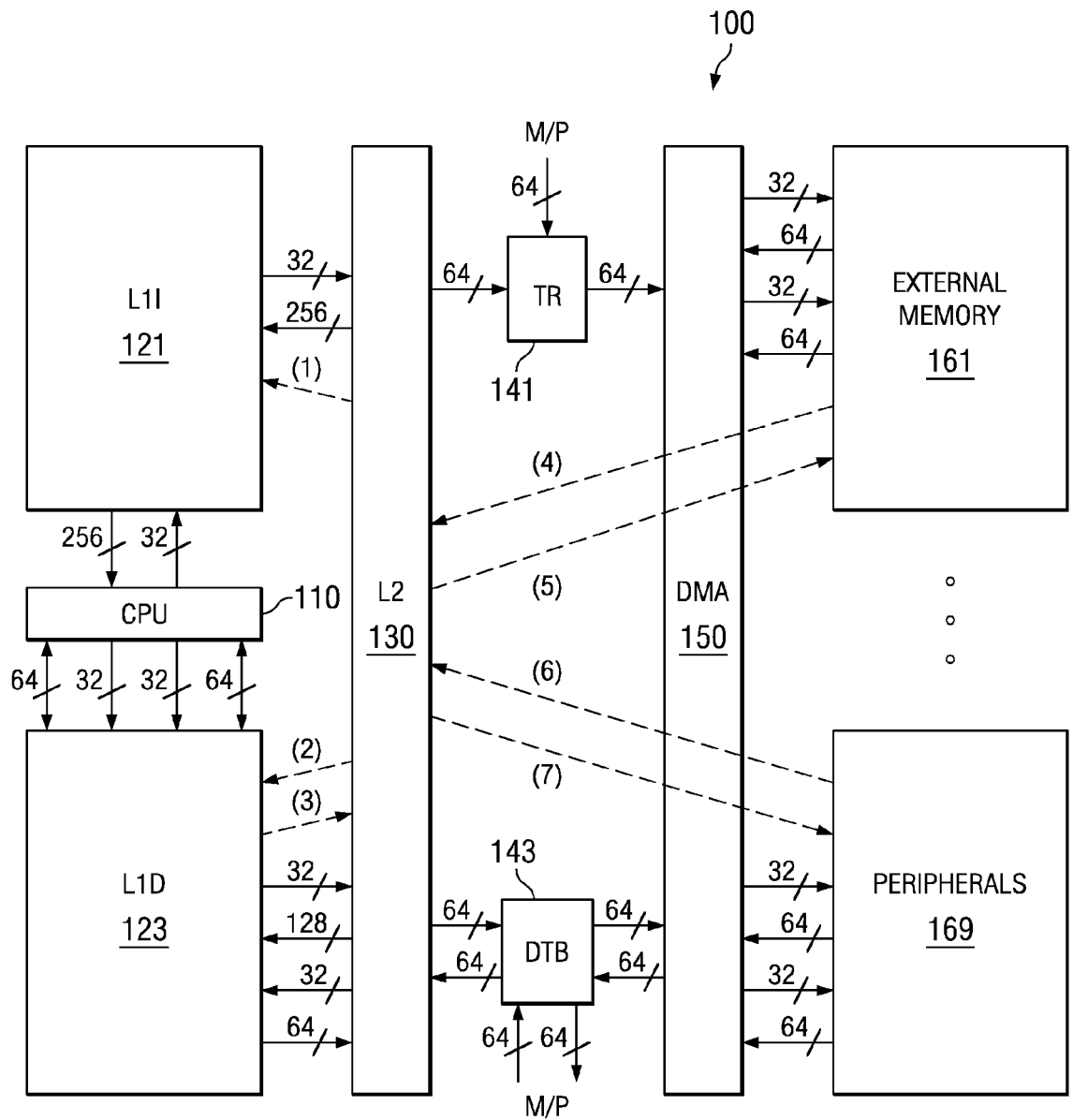
FIG. 1 illustrates the organization of a typical digital signal processor to which this invention is applicable (prior art)

FIG. 1 illustrates the organization of a typical digital signal processor system 100 to which this invention is applicable (prior art). Digital signal processor system 100 includes central processing unit core 110. Central processing unit core 110 includes the data processing portion of digital signal processor system 100. Central processing unit core 110 could be constructed as known in the art and would typically include a register file, an integer arithmetic logic unit, an integer multiplier and program flow control units. An example of an appropriate central processing unit core is described below in conjunction with FIGS. 2 to 4.

Digital signal processor system 100 includes a number of cache memories. FIG. 1 illustrates a pair of first level caches. Level one instruction cache (L1I) 121 stores instructions used by central processing unit core 110. Central processing unit core 110 first attempts to access any instruction from level one instruction cache 121. Level one data cache (L1D) 123 stores data used by central processing unit core 110. Central processing unit core 110 first attempts to access any required data from level one data cache 123. The two level one caches are backed by a level two unified cache (L2) 130. In the event of a cache miss to level one instruction cache 121 or to level one data cache 123, the requested instruction or data is sought from level two unified cache 130. If the requested instruction or data is stored in level two unified cache 130, then it is supplied to the requesting level one cache for supply to central processing unit core 110. As is known in the art, the requested instruction or data may be simultaneously supplied to both the requesting cache and central processing unit core 110 to speed use.

Level two unified cache 130 is further coupled to higher level memory systems. Digital signal processor system 100 may be a part of a multiprocessor system. The other processors of the multiprocessor system are coupled to level two unified cache 130 via a transfer request bus 141 and a data transfer bus 143. A direct memory access unit 150 provides the connection of digital signal processor system 100 to external memory 161 and external peripherals 169.

Figure 2:
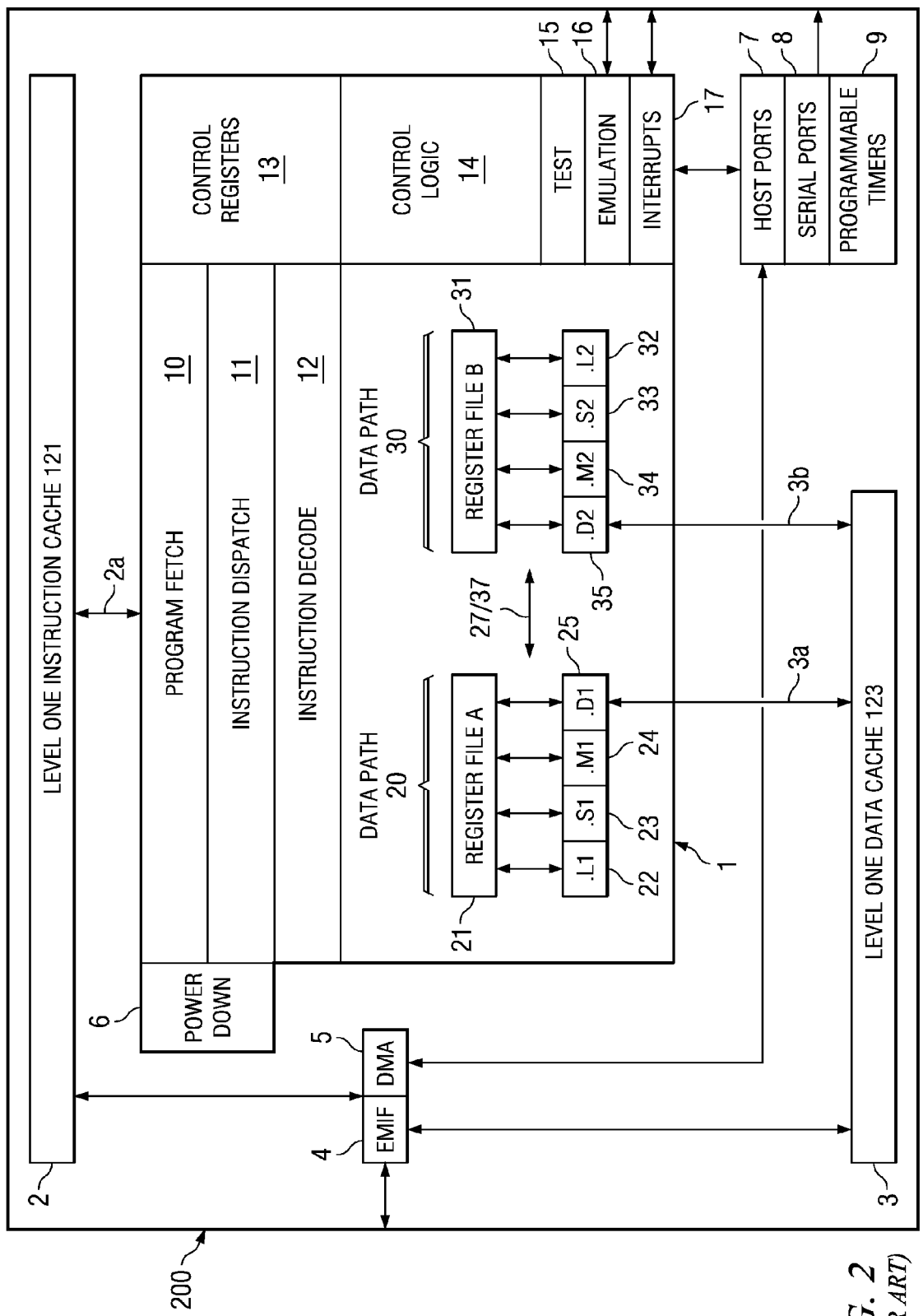
FIG. 2 illustrates details of a very long instruction word digital signal processor core suitable for use in FIG. 1 (prior art)

FIG. 2 is a block diagram illustrating details of a digital signal processor integrated circuit 200 suitable but not essential for use in this invention (prior art). The digital signal processor integrated circuit 200 includes central processing unit 1, which is a 32-bit eight-way VLIW pipelined processor. Central processing unit 1 is coupled to level 1 instruction cache 121 included in digital signal processor integrated circuit 200. Digital signal processor integrated circuit 200 also includes level one data cache 123. Digital signal processor integrated circuit 200 also includes peripherals 4 to 9. These peripherals preferably include an external memory interface (EMIF) 4 and a direct memory access (DMA) controller 5. External memory interface (EMIF) 4 preferably supports access to synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

Central processing unit 1 has a 32-bit, byte addressable address space. Internal memory on the same integrated circuit is preferably organized in a data space including level one data cache 123 and a program space including level one instruction cache 121. When off-chip memory is used, preferably these two spaces are unified into a single memory space via the external memory interface (EMIF) 4.

Level one data cache 123 may be internally accessed by central processing unit 1 via two internal ports 3a and 3b. Each internal port 3a and 3b preferably has 32 bits of data and a 32-bit byte address reach. Level one instruction cache 121 may be internally accessed by central processing unit 1 via a single port 2a. Port 2a of level one instruction cache 121 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and thirty two 32-bit A registers forming register file 21. Second data path 30 likewise includes four functional units designated L2 unit 32, S2 unit 33, M2 unit 34 and D2 unit 35 and thirty two 32-bit B registers forming register file 31. The functional units of each data path access the corresponding register file for their operands. There are two cross paths 27 and 37 permitting access to one register in the opposite register file each pipeline stage. Central processing unit 1 includes control registers 13, control logic 14, and test logic 15, emulation logic 16 and interrupt logic 17.

Program fetch unit 10, instruction dispatch unit 11 and instruction decode unit 12 recall instructions from level one instruction cache 121 and deliver up to eight 32-bit instructions to the functional units every instruction cycle. Processing occurs in each of the two data paths 20 and 30. As previously described above each data path has four corresponding functional units (L, S, M and D) and a corresponding register file containing thirty two 32-bit registers. Each functional unit is controlled by a 32-bit instruction. The data paths are further described below. A control register file 13 provides the means to configure and control various processor operations.

Figure 3:
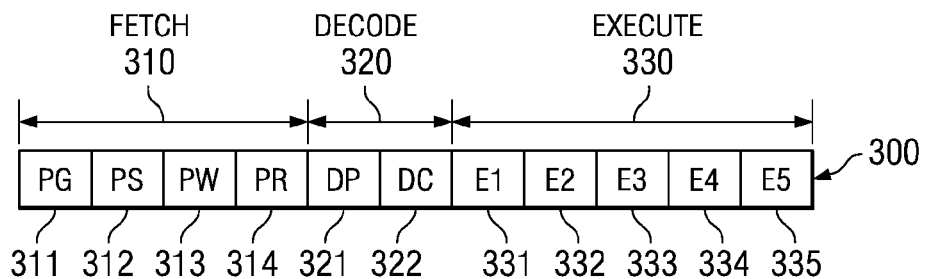
FIG. 3 illustrates the pipeline stages of the very long instruction word digital signal processor core illustrated in FIG. 2 (prior art)

FIG. 3 illustrates the pipeline stages 300 of digital signal processor core 110 (prior art). These pipeline stages are divided into three groups: fetch group 310; decode group 320; and execute group 330. All instructions in the instruction set flow through the fetch, decode, and execute stages of the pipeline. Fetch group 310 has four phases for all instructions, and decode group 320 has two phases for all instructions. Execute group 330 requires a varying number of phases depending on the type of instruction.

The fetch phases of the fetch group 310 are: Program address generate phase 311 (PG); Program address send phase 312 (PS); Program access ready wait stage 313 (PW); and Program fetch packet receive stage 314 (PR). Digital signal processor core 110 uses a fetch packet (FP) of eight instructions. All eight of the instructions proceed through fetch group 310 together. During PG phase 311, the program address is generated in program fetch unit 10. During PS phase 312, this program address is sent to memory. During PW phase 313, the memory read occurs. Finally during PR phase 314, the fetch packet is received at CPU 1.

The decode phases of decode group 320 are: Instruction dispatch (DP) 321; and Instruction decode (DC) 322. During the DP phase 321, the fetch packets are split into execute packets. Execute packets consist of one or more instructions which are coded to execute in parallel. During DP phase 322, the instructions in an execute packet are assigned to the appropriate functional units. Also during DC phase 322, the source registers, destination registers and associated paths are decoded for the execution of the instructions in the respective functional units.

The execute phases of the execute group 330 are: Execute 1 (E1) 331; Execute 2 (E2) 332; Execute 3 (E3) 333; Execute 4 (E4) 334; and Execute 5 (E5) 335. Different types of instructions require different numbers of these phases to complete. These phases of the pipeline play an important role in understanding the device state at CPU cycle boundaries.

During E1 phase 331, the conditions for the instructions are evaluated and operands are read for all instruction types. For load and store instructions, address generation is performed and address modifications are written to a register file. For branch instructions, branch fetch packet in PG phase 311 is affected. For all single-cycle instructions, the results are written to a register file. All single-cycle instructions complete during the E1 phase 331.

During the E2 phase 332, for load instructions, the address is sent to memory. For store instructions, the address and data are sent to memory. Single-cycle instructions that saturate results set the SAT bit in the control status register (CSR) if saturation occurs. For single cycle 16 by 16 multiply instructions, the results are written to a register file. For M unit non-multiply instructions, the results are written to a register file. All ordinary multiply unit instructions complete during E2 phase 322.

During E3 phase 333, data memory accesses are performed. Any multiply instruction that saturates results sets the SAT bit in the control status register (CSR) if saturation occurs. Store instructions complete during the E3 phase 333.

During E4 phase 334, for load instructions, data is brought to the CPU boundary. For multiply extension instructions, the results are written to a register file. Multiply extension instructions complete during the E4 phase 334.

During E5 phase 335, load instructions write data into a register. Load instructions complete during the E5 phase 335.

Figure 4:
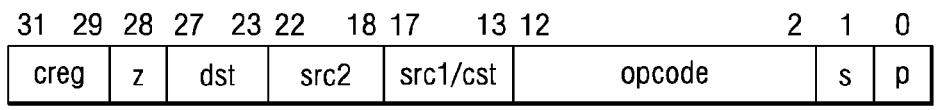
FIG. 4 illustrates the instruction syntax of the very long instruction word digital signal processor core illustrated in FIG. 2 (prior art)

FIG. 4 illustrates an example of the instruction coding of instructions used by digital signal processor core 110 (prior art). Each instruction consists of 32 bits and controls the operation of one of the eight functional units. The bit fields are defined as follows. The creg field (bits 29 to 31) is the conditional register field. These bits identify whether the instruction is conditional and identify the predicate register. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field is encoded in the instruction opcode as shown in Table 1.

TABLE 1

| Conditional Register | creg | | | z |
|---|---|---|---|---|
| | 31 | 30 | 29 | 28 |
| Unconditional | 0 | 0 | 0 | 0 |
| Reserved | 0 | 0 | 0 | 1 |
| B0 | 0 | 0 | 1 | z |
| B1 | 0 | 1 | 0 | z |
| B2 | 0 | 1 | 1 | z |
| A1 | 1 | 0 | 0 | z |
| A2 | 1 | 0 | 1 | z |
| A0 | 1 | 1 | 0 | z |
| Reserved | 1 | 1 | 1 | x |

Note that "z" in the z bit column refers to the zero/not zero comparison selection noted above and "x" is a don't care state. This coding can only specify a subset of the 32 registers in each register file as predicate registers. This selection was made to preserve bits in the instruction coding.

The dst field (bits 23 to 27) specifies one of the 32 registers in the corresponding register file as the destination of the instruction results.

The scr2 field (bits 18 to 22) specifies one of the 32 registers in the corresponding register file as the second source operand.

The scr1/cst field (bits 13 to 17) has several meanings depending on the instruction opcode field (bits 3 to 12). The first meaning specifies one of the 32 registers of the corresponding register file as the first operand. The second meaning is a 5-bit immediate constant. Depending on the instruction type, this is treated as an unsigned integer and zero extended to 32 bits or is treated as a signed integer and sign extended to 32 bits. Lastly, this field can specify one of the 32 registers in the opposite register file if the instruction invokes one of the register file cross paths 27 or 37.

The opcode field (bits 3 to 12) specifies the type of instruction and designates appropriate instruction options. A detailed explanation of this field is beyond the scope of this invention except for the instruction options detailed below.

The s bit (bit 1) designates the data path 20 or 30. If s=0, then data path 20 is selected. This limits the functional unit to L1 unit 22, S1 unit 23, M1 unit 24 and D1 unit 25 and the corresponding register file A 21. Similarly, s=1 selects data path 20 limiting the functional unit to L2 unit 32, S2 unit 33, M2 unit 34 and D2 unit 35 and the corresponding register file B 31.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

Digital signal processor system 100 typically has a cache miss penalty of 2 cycles. This means that if a cache miss is detected in level one instruction cache 121 or level one data cache 123 in cycle 1, in cycle 2 digital signal processing system 100 sends a request to level two unified cache 130. If this access doesn't produce a stall (such as when the data is not within level two unified cache 130), the request is serviced in the same cycle. In cycle 3 the data will be returned to the cache controller. The cache controller will write this returned data into a miss register and into the requesting level one cache. In the case of an instruction access central processing unit core 110 receives the instruction packet from the miss register and not directly from level one instruction cache 121. The earliest read from level one instruction cache 121 can begin in cycle 4 and data is returned by level one instruction cache 121 in cycle 5.

This invention takes advantage of the fact that in cycle 4, there is no data movement within level one instruction cache 121. This fact is used in level one instruction cache clock switch. This fact enables this invention because the level one instruction cache 121 timing was critical both for the paths from main memory 161 to level one instruction cache 121 and from level one instruction cache 121 to central processing unit core 110. Alternative solutions would introduce one more cycle of miss penalty.

This invention proposes dynamic clock switch to give more time for cache writes. This application will first explain the working of the clock switching. This application will then explain the parameters of the clock switching.

Figure 5:
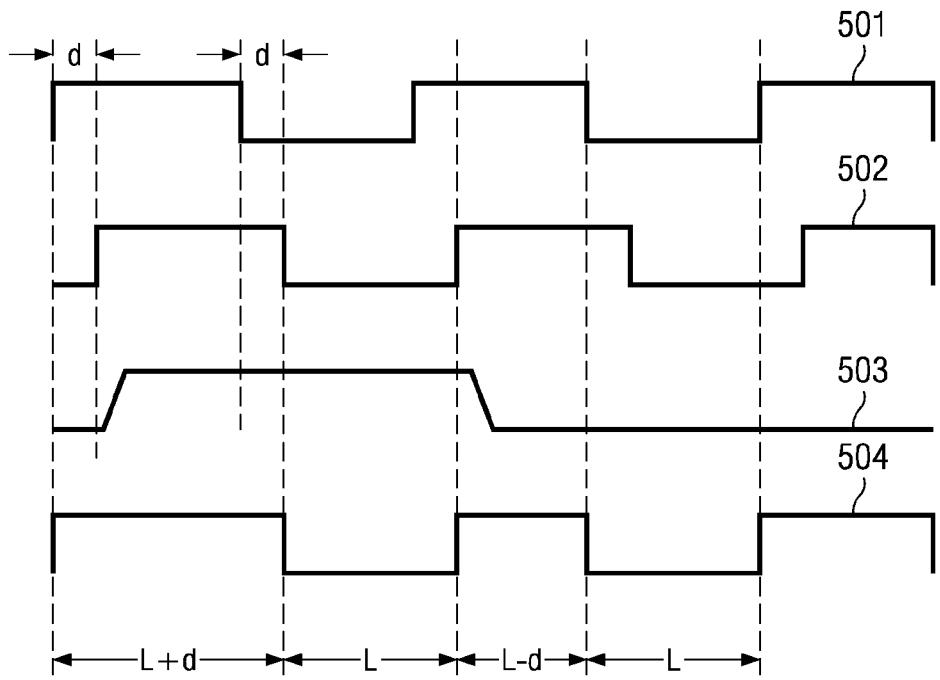
FIG. 5 illustrates timing diagrams of the dynamic clock control of this invention.

FIG. 5 illustrates several clock waveforms useful in understanding the dynamic clock switching of this application. Waveform 501 is the prior art equal duty cycle clock signal normally employed in a data processing apparatus such as digital signal processor system 100. Waveform 502 is a similar equal duty cycle clock signal delayed by the time d. Waveform 503 is derived from waveform 502. When enabled by a signal indicating a write to cache on the next cycle, waveform 503 switches between high and low states for each positive going edge of waveform 502. FIG. 5 illustrates one cycle of waveform 503 triggered by a single write next cycle signal. This switching prevents clock glitches as will be further described below. Waveform 504 is the desired dynamically switched clock waveform. Waveform 504 has the state of waveform 502 when waveform 503 is high and has the state of waveform 501 when waveform 503 is low. As illustrated in FIG. 5, waveform 504 is asymmetric. The low state of waveform 504 always has an interval L. The high state of waveform 504 alternates between a long interval L+d and a short interval L−d.

Figure 6:
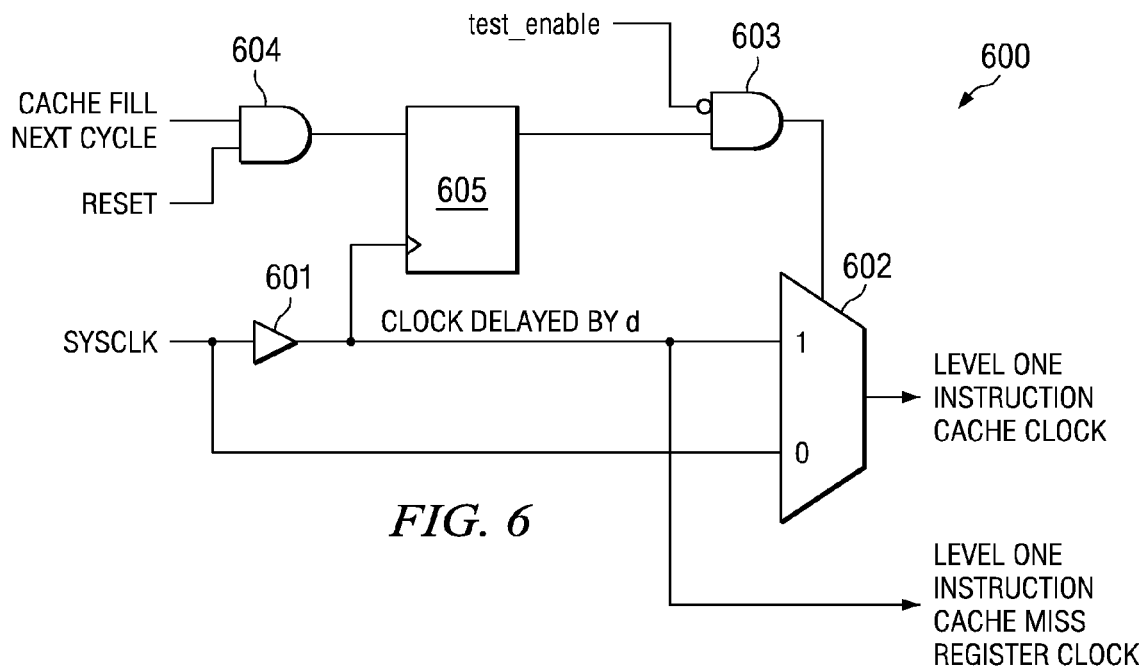
FIG. 6 illustrates a circuit suitable for dynamic clock control according to this invention.

FIG. 6 illustrates circuit 600 that produces the waveform 504 at particular triggered times. The system clock SYSCLK supplies two inputs of multiplexer 602. The 1 input of multiplexer 602 receives the output of delay 601. Delay 601 produces the delay d illustrated in FIG. 5. The 0 input of multiplexer 602 receives SYSCLK directly.

AND gate 603 supplies the control input to multiplexer 602. An inverting input of AND gate 603 receives a test_enable signal. The polarity of the test_enable signal causes multiplexer 602 to select SYSCLK (the 0 input) when digital signal processor 100 is in a test mode. This prevents the dynamically delayed clock of this invention from interfering with device test.

AND gate 604 receives two signals, a first signal indicating that a cache fill operation will occur on the next instruction cycle and a reset signal. The polarity of the reset signal prevents selection of the dynamically delayed clock during reset. The output of AND gate 604 enables flip-flop 605. Flip-flop 605 receives the delayed clock signal from delay 601 at its clock input. Flip-flop 605 generates waveform 503 illustrated in FIG. 5 by toggling between high and low outputs on each rising edge of the delayed clock signal from delay 601 when enabled. The cache fill next cycle signal generally occurs at isolated intervals. Thus the waveform 503 generated by flip-flop 605 typically consists of isolated, elongated pulses as illustrated in FIG. 5. The output of multiplexer 602 is the dynamically delayed waveform 504 illustrated in FIG. 5. Note that FIG. 6 also shows an output of the delayed clock to level one instruction cache miss register.

Figure 7:
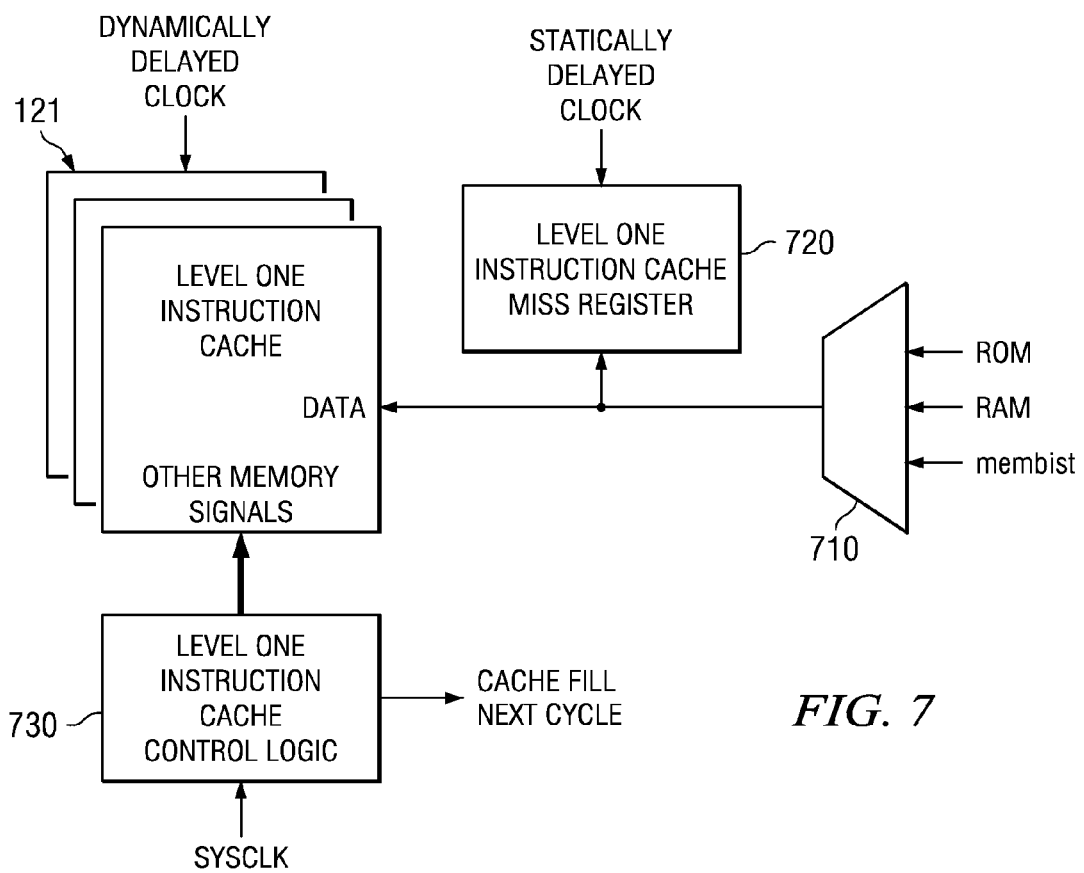
FIG. 7 illustrates key components in the memory to memory data path and their relation to this invention.

FIG. 7 illustrates the use of these clocks. Multiplexer 710 selects the source of instruction(s) coming into the cache system. This selection is from among a set including at least read only memory (ROM), random access memory (RAM) and from the Built-In System Test (membist) during testing. The selected instruction(s) are supplied to both level one instruction cache 121 and level one instruction cache miss register 720. Level one instruction cache 121 stores these instruction(s) for later reuse. Level one instruction cache miss register 720 supplies the requested instruction directly to central processing unit core 110. Note that central processing unit core 110 is waiting for this instruction every time a cache fill occurs. The connections to central processing unit core 110 are not illustrated in FIG. 7. Level one instruction cache control logic 730 controls the operation of level one instruction cache 121 in response to instruction requests from central processing unit core 110. As illustrated in FIG. 7, level one instruction cache control logic 730 generates the cache fill next cycle signal used in FIG. 6.

FIG. 7 illustrates the clock connections to various parts. Level one instruction cache 121 receives the dynamically delayed clock from multiplexer 602. Level one instruction cache miss register receives the statically delayed clock from delay 601. Level one instruction cache control logic 730 and other data sources receive the normal clock SYSCLK.

Optionally, it is also possible to design the circuit of FIG. 6 so that that the clock high time remains the same, while the clock low time expands or shrinks.

The maximum delay d is determined as follows. Let the minimum pulse width for a low pulse be PWmin0 and the minimum pulse width for a high pulse be PWmin1. Let the clock Period be P. Thus the nominal low time is P/2. Making the conservative assumption of a 40% clock duty cycle, then the minimum clock pulse width is 0.4*P. Accordingly the maximum delay d is 0.4*P−PWmin1. This value needs to be scaled to provide an adequate design margin in selecting the delay d.

The dynamic clock delaying of this invention must meet certain timing requirements. Multiplexer 602 must make its selection after transition of the delayed clock from delay 601. This condition may be guaranteed by design if all the parts of FIG. 6 are placed physically close together. The minimum pulse width of level one instruction cache 121 must be satisfied. The sum of delay d and the additional delay on the switch signal should be considerably smaller than half a clock cycle period to avoid glitches. This can be ensured by close physical spacing of the circuit. The delay d must meet the minimum cycle time requirement of level one instruction cache 121 in the cycle in which clock width shrinks. Level one instruction miss register must meet its hold time requirement. The input pins of level one instruction cache 121 other than data pins will have larger hold time requirement because of the delayed clock. These inputs including address and write signal may need additional hold time fixes.

This invention has some implications for testing. As previously noted, in test mode the normal, non-delayed clock is always used. In test mode, the memory to memory path does not get exercised.

Due to the dynamic nature of the clock switching of this invention, special care is required when defining the constraints. Different strategies were used for timing analysis constraints and for synthesis constraints purposes. Two different functional modes are created to satisfy timing analysis constraints. In the first mode the clock is delayed and the second mode the clock is not delayed. In the delayed clock mode, the memory to memory paths and the memory address and memory control signal paths are checked for setup and hold. In the normal clock mode, the paths from cache to central processing unit are checked. During synthesis, only one mode can be used. This one mode needs to optimize both the paths starting from cache memory, and paths ending in cache memory. The clock on the cache memory is defined as the normal, non-delayed clock. This clock pin is assigned an uncertainty equal to the delay on the clock in the delayed clock mode. This ensures that hold paths ending into the memory address and control pins are optimized and hold constraints are met. The paths starting from main memory ending into the cache memory are given constraint relaxed by the delay d to take into account the fact that the memory clock was specified as non-delayed clock.

What is claimed is:

1. A data processing apparatus comprising:
   a delay having an input receiving a system clock signal and an output producing a delayed clock signal delayed by a predetermined amount;
   a flip-flop having a clock input receiving said delayed clock signal, an enable input receiving a signal indicative of whether a cache fill operation will occur in a next cycle and an output;
   an AND gate having a first input receiving said output of said flip-flop, a second input receiving a signal indicative of whether a test mode is active in the data processing apparatus and an output;
   said signal indicative of whether a test mode is active having a polarity whereby said multiplexer selected said system clock signal whenever said test mode is active;
   a multiplexer having a first input receiving said delayed clock signal, a second input receiving said system clock signal, a control input connected to said output of said AND gate and an output, said output corresponding to one of said inputs dependent upon a digital state of said control input; and
   a cache memory receiving said output of said multiplexer at a clock input.

2. A data processing apparatus comprising:
a delay having an input receiving a system clock signal and an output producing a delayed clock signal delayed by a predetermined amount;
a flip-flop having a clock input receiving said delayed clock signal, an enable input receiving a signal indicative of whether a cache fill operation will occur in a next cycle and an output;
a multiplexer having a first input receiving said delayed clock signal, a second input receiving said system clock signal, a control input connected to said output of said flip-flop and an output, said output corresponding to one of said inputs dependent upon a digital state of said control input;
a cache memory receiving said output of said multiplexer at a clock input; and
a cache miss register storing recalled data from a cache fill operation for supply to a requesting central processing unit, said cache miss register receiving said delayed clock signal at a clock input.

* * * * *